(12) United States Patent
Tanaka et al.

(10) Patent No.: US 7,111,615 B2
(45) Date of Patent: Sep. 26, 2006

(54) FUEL INJECTION CONTROL SYSTEM

(75) Inventors: Hiroshi Tanaka, Wako (JP); Shunji Akamatsu, Wako (JP); Kazuhiko Sakaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 66 days.

(21) Appl. No.: 10/915,287

(22) Filed: Aug. 10, 2004

(65) Prior Publication Data

US 2005/0066943 A1    Mar. 31, 2005

(30) Foreign Application Priority Data

Aug. 21, 2003    (JP) .............................. 2003-208258
Sep. 18, 2003    (JP) .............................. 2003-326449

(51) Int. Cl.
*F02D 41/06* (2006.01)

(52) U.S. Cl. .............. 123/491; 123/179.4; 123/179.16; 701/112; 701/113

(58) Field of Classification Search .............. 123/491, 123/685, 179.4, 179.16; 701/104, 112, 113
See application file for complete search history.

(56) References Cited

U.S. PATENT DOCUMENTS

| | | | | |
|---|---|---|---|---|
| 5,769,054 A | * | 6/1998 | Schnaibel et al. | 123/406.47 |
| 6,253,145 B1 | * | 6/2001 | Garrard et al. | 701/105 |
| 6,466,860 B1 | * | 10/2002 | Kaneko | 701/112 |
| 6,655,359 B1 | * | 12/2003 | Hasegawa et al. | 123/491 |
| 6,832,151 B1 | * | 12/2004 | Kumazaki et al. | 701/112 |
| 6,950,739 B1 | * | 9/2005 | Matsubara et al. | 701/103 |
| 2002/0013655 A1 | * | 1/2002 | Amano et al. | 701/112 |
| 2002/0116113 A1 | * | 8/2002 | Kaneko | 701/112 |
| 2003/0004635 A1 | * | 1/2003 | Kamiya et al. | 701/112 |

FOREIGN PATENT DOCUMENTS

| | | |
|---|---|---|
| JP | 64-56931 | 3/1989 |
| JP | 2002-115578 | 4/2002 |

* cited by examiner

*Primary Examiner*—Erick R Solis
(74) *Attorney, Agent, or Firm*—Hamre, Schumann, Mueller & Larson, P.C.

(57) ABSTRACT

Embodiments of the invention enhance the starting performance of an engine from an automatic stoppage state, in a vehicle with an automatic engine stopping and starting system mounted thereon. In an embodiment, an engine start judging unit detects the presence or absence of a vehicle starting operation on the basis of the status of a throttle switch in an automatic stoppage state of an engine, and, when the seating of the driver is confirmed based on the status of a seat switch, the engine is started. A basic injection amount calculating unit calculates a basic fuel injection amount $T_i$ on the basis of engine parameters such as the engine cooling water temperature $T_W$ and the engine speed $N_e$. An injection amount increasing unit performs a control to increase the fuel injection amount at the time of starting the engine from the automatic stoppage state of the engine, based on the throttle opening detected by a throttle sensor.

18 Claims, 7 Drawing Sheets

CONDITION 1: MAIN SWITCH TURNED FROM "OFF" TO "ON".
CONDITION 2: VEHICLE SPEED IS NOT LESS THAN SCHEDULED VEHICLE SPEED, WATER TEMPERATURE IS NOT LESS THAN 50 C, AND IDLE SWITCH IS "OFF".
CONDITION 3: IDLE SWITCH TURNED FROM "OFF" TO "ON".
CONDITION 4: MAIN SWITCH TURNED FROM "ON" TO "OFF".
CONDITION 5: NON-SEATED CONDITION CONTINUES AFTER AUTOMATIC STOPPAGE OF ENGINE.

FUEL INJECTION CONTROL SYSTEM

FIELD OF THE INVENTION

The present invention relates to a fuel injection control system for controlling the injection amount of a fuel supplied to an engine, and particularly to a fuel injection control system for a vehicle with an automatic engine stopping and starting system mounted thereon for automatically stopping the engine in response to a predetermined vehicle stopping condition and thereafter restarting the engine in response to a predetermined vehicle starting operation.

BACKGROUND OF THE INVENTION

As a technology for enhancing the starting performance of an engine, a technology for reducing the fuel injection amount at an engine starting time as compared to that at the normal time is disclosed in Japanese Patent Laid-open No. Sho 64-56931. This technology is in view of the fact that the engine is often in a low-temperature state at the time of starting the engine and that, if the fuel in an amount comparable to that in the normal operation is injected notwithstanding the reduction in the amount of petroleum evaporated, the petroleum in liquid state would be deposited on a spark plug, leading to misfire.

On the other hand, a vehicle with an automatic engine stopping and starting system mounted thereon for stopping the engine in response to a predetermined vehicle stopping condition and, after the automatic stoppage, restarting the engine in response to a predetermined vehicle starting operation is disclosed in Japanese Patent Laid-open No. 2002-115578. In such a vehicle, when a throttle grip is operated to open after automatic stoppage of the engine, this operation is recognized as a vehicle starting operation and the engine is restarted.

In a system in which the engine is started in response to the operation of opening the throttle grip, if the fuel injection amount at the engine starting time is reduced as compared with that in the normal operation in the case where the throttle opening is enlarged by the driver at a vehicle starting time after automatic stoppage of the engine, the fuel amount may become comparatively insufficient and the fuel-air mixture may become lean, possibly resulting in a lowering in the starting performance of the engine.

A need exists for fuel injection control systems in which the starting performance of an engine from an automatic stoppage state of the engine is enhanced, in a vehicle with an automatic engine stopping and starting system mounted thereon.

SUMMARY OF THE INVENTION

The present invention relates to a fuel injection control system for controlling the injection amount of a fuel supplied to an engine, and particularly to a fuel injection control system for a vehicle with an automatic engine stopping and starting system mounted thereon for automatically stopping the engine in response to a predetermined vehicle stopping condition and thereafter restarting the engine in response to a predetermined vehicle starting operation.

In an embodiment of the present invention, there is provided a fuel injection control system for a vehicle with an automatic engine stopping and starting system mounted thereon for automatically stopping an engine in response to a predetermined vehicle stopping condition and thereafter restarting the engine in response to a predetermined vehicle starting operation.

In an embodiment, the fuel injection control system comprises a throttle sensor for detecting the throttle opening, engine start judging means for starting the engine in response to a throttle opening operation during automatic stoppage of the engine, basic injection amount calculating means for calculating a basic fuel injection amount on the basis of predetermined engine parameters, and injection amount increasing means for performing a control to increase the fuel injection amount at the time of starting the engine from the automatic stoppage state of the engine, based on the throttle opening.

The fuel injection control system can further comprise injection amount decreasing means for performing a control to decrease the fuel injection amount on the basis of the throttle opening at the time of starting the engine from other state than the automatic stoppage state of the engine.

In an embodiment, the injection amount increasing means comprises: an injection amount increase table determining the relationship between the throttle opening at the engine starting time and an injection amount increase coefficient, means for obtaining an injection amount increase coefficient on the basis of the throttle opening and the injection amount increase table, and calculating means for setting the result of multiplication of the basic injection amount by the injection amount increase coefficient to be a new basic injection amount.

In an embodiment, the fuel injection control system is characterized in that the throttle opening at which the control to increase the injection amount is started is smaller than the throttle opening at which the control to decrease the injection amount is started.

In an embodiment, the fuel injection control system is characterized by comprising a throttle sensor for detecting the throttle opening, engine start judging means for starting the engine in response to a throttle opening operation during automatic stoppage of the engine, basic injection amount calculating means for calculating a basic fuel injection amount on the basis of predetermined engine parameters, injection amount decreasing means for performing a control to decrease the fuel injection amount at the time of starting the engine, and injection amount decreasing control prohibiting means for prohibiting the control to decrease the fuel injection amount at the time of starting the engine from an automatic stoppage state of the engine.

DETAILED DESCRIPTION

In a system in which the engine is started in response to the operation of opening the throttle grip, if the fuel injection amount at the engine starting time is reduced as compared with that in the normal operation in the case where the throttle opening is enlarged by the driver at a vehicle starting time after automatic stoppage of the engine, the fuel amount may become comparatively insufficient and the fuel-air mixture may become lean, possibly resulting in a lowering in the starting performance of the engine.

It is an object of the present invention to provide a fuel injection control system in which the starting performance of an engine from an automatic stoppage state of the engine is enhanced, in a vehicle with an automatic engine stopping and starting system mounted thereon.

In an embodiment, when the throttle is operated to open for the purpose of starting the engine in the automatic stoppage state of the engine, a control to increase the fuel injection amount is performed. Therefore, the fuel in an amount according to the throttle opening can be injected into the cylinder, whereby an appropriate air-fuel ratio can be obtained, so that the starting performance of the engine is enhanced.

In an embodiment, a correction to decrease the fuel injection amount is conducted at the time of starting the engine from other state than the automatic stoppage state of the engine, so that the starting performance at the time of starting the engine for the first time after the main switch is closed is enhanced.

In an embodiment, the injection amount increase table is searched based on the throttle opening to obtain an injection amount increase coefficient, and the basic injection amount is multiplied by the injection amount increase coefficient to obtain an injection amount after an increase in amount. Therefore, a control to increase the injection amount can be performed easily.

In an embodiment, the timing of starting the injection amount increasing/decreasing control can be set appropriately both at the time of starting the engine from other state than the automatic stoppage state when the control to decrease the injection amount is required only in the case where the throttle opening is comparatively large because the engine temperature is low and at the time of starting the engine from the automatic stoppage state when the control to increase the injection amount is required from a comparatively small throttle opening because the engine temperature is high.

In an embodiment, the fuel injection amount at the engine starting time is relatively increased at the time of starting the engine from the automatic stoppage state as compared with the time of starting the engine from other state than the automatic stoppage state, so that an appropriate air-fuel ratio can be obtained, and the starting performance of the engine is enhanced.

Figure 1:
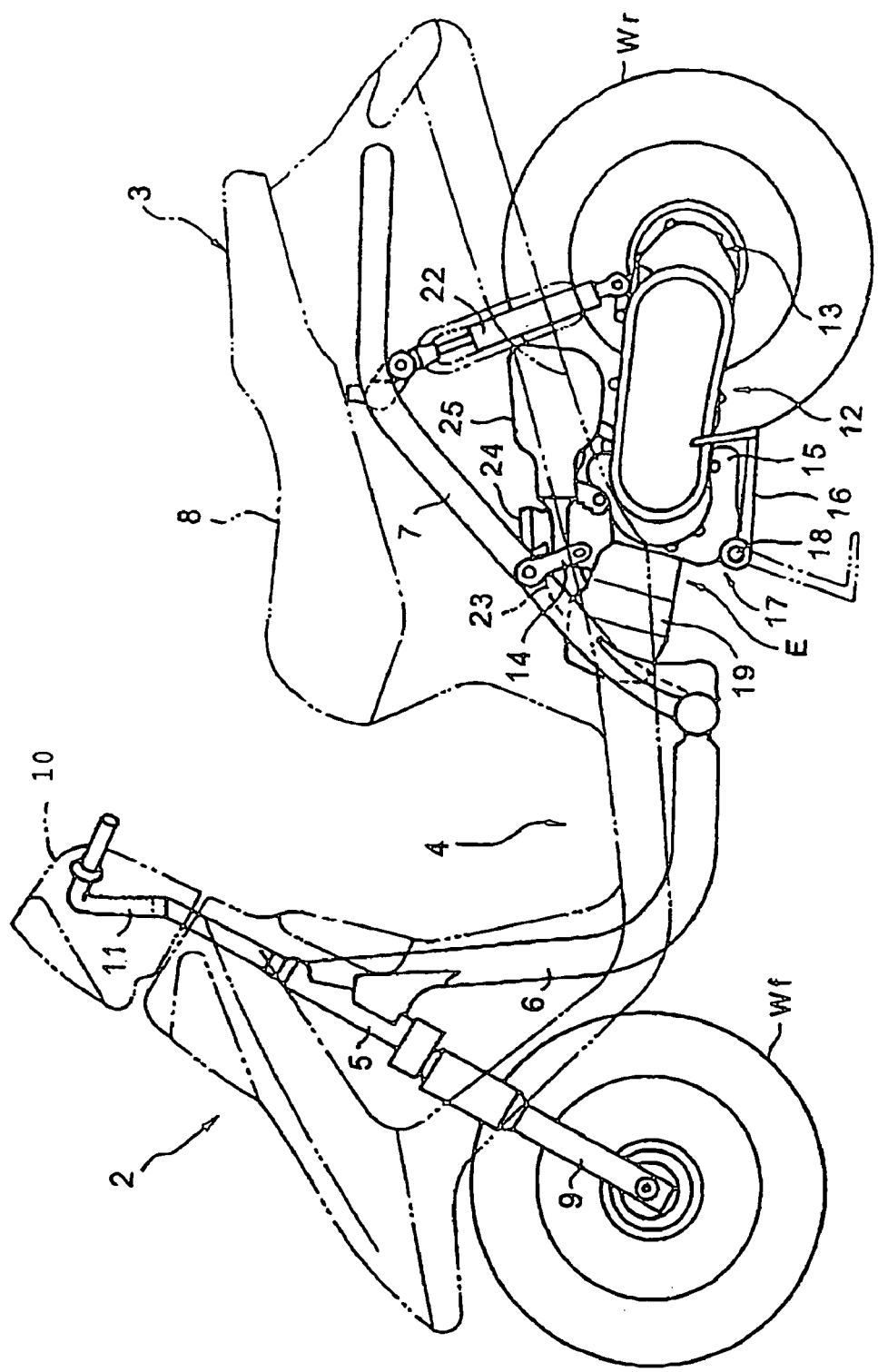
FIG. 1 is a general side view of a motorcycle on which the fuel injection control system according to the present invention is mounted.

Now, preferred embodiments of the present invention will be described in detail, referring to the drawings. FIG. 1 is a general side view of a motorcycle on which the fuel injection control system according to the present invention is mounted, in which an automatic engine stopping and starting system for stopping an engine in response to a predetermined vehicle stopping condition and thereafter restarting the engine in response to a predetermined vehicle starting condition is mounted on the motorcycle.

A vehicle body front portion 2 and a vehicle body rear portion 3 are connected to each other through a low floor portion 4, and a vehicle body frame inclusive of a down tube 6 and a main pipe 7 constitutes a skeleton of the vehicle body. A fuel tank and a luggage box (both not shown) are supported by the main pipe 7, and a seat 8 is disposed on the upper side thereof. The seat 8 can function also as a lid for the luggage box provided therebeneath, and the seat 8 is operable and closable by a hinge mechanism provided at a front portion thereof.

In the vehicle body front portion 2, a steering head 5 is provided on the down tube 6, and a front fork 9 is rotatably supported by the steering head 5. A steering handle 11 is attached to the upper end of the front fork 9 extending upwards, while a front wheel $W_f$ is shaft-supported on lower ends of the front fork 9. An upper portion of the steering handle 11 is covered with a steering handle cover 10 which functions also as a gauge board.

A link member (hanger) 14 is turnably supported on an intermediate portion of the main pipe 7, and a swing unit 17 is swingably connected to and supported on the main pipe 7 through the hanger 14. A single-cylinder four-cycle engine E is mounted on a front portion of the swing unit 17. A belt-type continuously variable transmission 12 is constructed in the range from the engine E rearwards, and a rear wheel $W_r$ is rotatably supported on a speed reduction mechanism 13 provided at a rear portion of the continuously variable transmission 12 with a centrifugal clutch therebetween. A rear cushion 22 (or shock absorber) is interposed between the upper end of the speed reduction mechanism 13 and an upper bent portion of the main pipe 7.

An intake pipe 23 extended from a cylinder head 19 of the engine E is connected to a front portion of the swing unit 17, and, further, a carburetor 24 and an air cleaner 25 connected thereto are disposed at the intake pipe 23. A main stand 16 is movably mounted to a pivot shaft 18 provided at a lower portion of a swing unit case 15, and the main stand 16 is erected (as indicated by chain line) at the time of parking.

Figure 2:
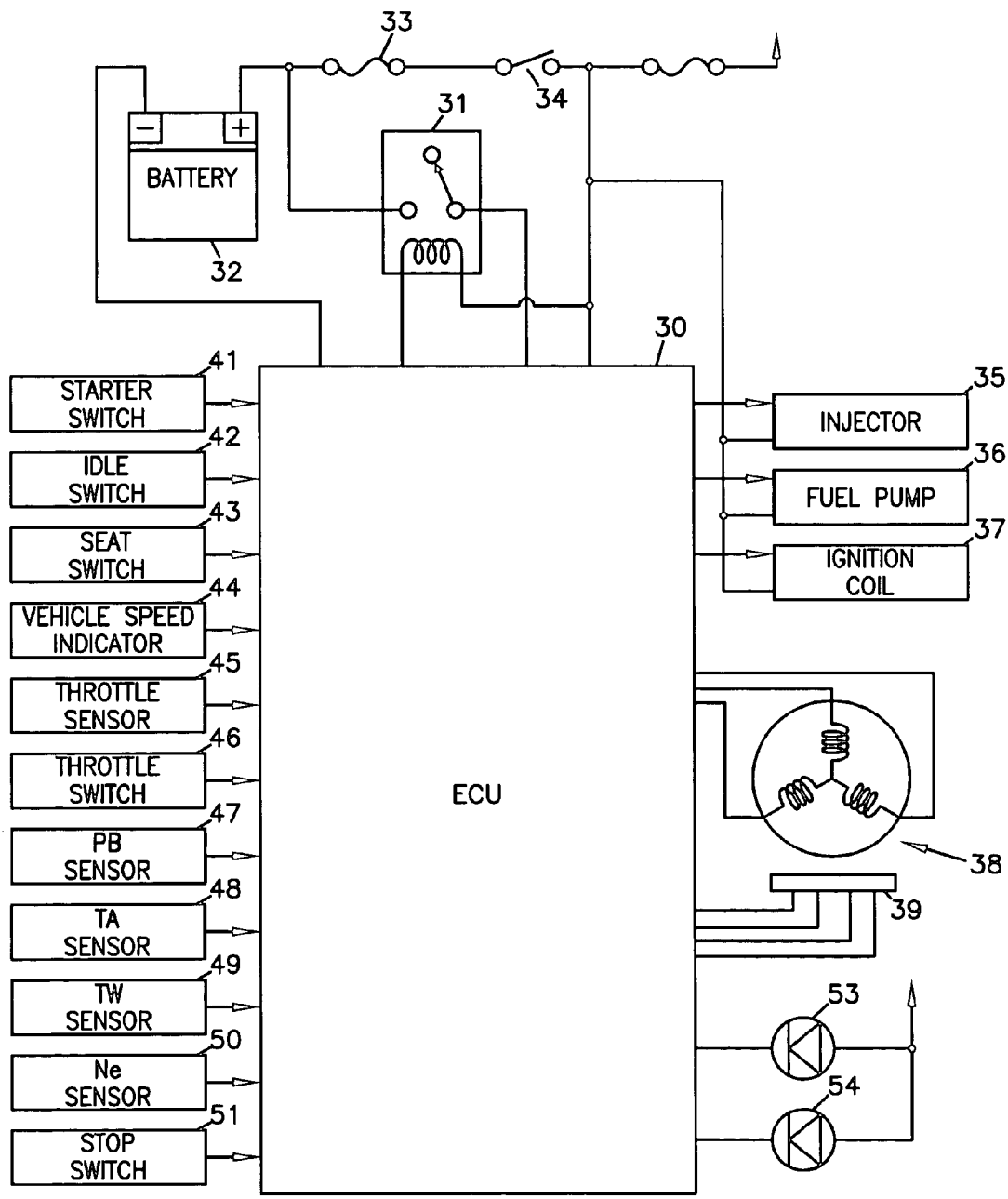
FIG. 2 is a block diagram of an automatic engine starting and stopping system.

FIG. 2 is a block diagram showing the configuration of the automatic engine starting and stopping system, in which the same symbols as above denote components which are the same as or equivalent to the above-mentioned.

A battery 32 is connected to an ECU 30 through a starter relay 31. An injector 35, a fuel pump 36 and an ignition coil 37 are supplied with a drive current from the battery 32 through a main fuse 33 and a main switch 34. The rotor angle of an AC generator (ACG) 38 functioning also as a starter is detected by a magnetic pole sensor 39.

A starter switch 41 for starting the engine, an idle switch 42 for manually permitting or restricting the idling of the engine, a seat switch 43 for detecting whether or not the driver is seated on the seat 8, a vehicle speed sensor 44 for detecting the running speed, a throttle sensor 45 for detecting the throttle opening $\theta_{th}$, a throttle switch for detecting whether or not the throttle opening $\theta_{th}$ has exceeded a predetermined opening, a PB sensor 47 for detecting the intake negative pressure (PB), a $T_A$ sensor 48 for detecting the atmospheric air temperature, a $T_W$ sensor 49 for detecting the cooling water temperature, an $N_e$ sensor 50 for detecting the engine speed $N_e$, a stop switch 51 for detecting a braking operation, a stand-by indicator 53 which blinks in an "automatic vehicle stopping and starting mode" described later, and an ECU indicator 54 which blinks at the time of emergency in the ECU 30, are further connected to the ECU 30.

The automatic engine stopping and starting system comprises an operation mode in which idling is permitted (hereinafter referred to as the "start & idle switch (SW) mode") and an operation mode in which idling is restricted (or prohibited) (hereinafter referred to as the "automatic vehicle stopping and starting mode").

In the "start & idle switch (SW) mode" in which idling is permitted, idling is temporarily permitted after the first engine starting after the main switch 34 is closed, for the purpose of performing a warm-up operation at the time of engine starting or the like. Other than the case after the first engine starting, idling is permitted also according to the will of the driver (with the idle switch 42 turned "ON"). On the other hand, in the "automatic vehicle stopping and starting mode" in which idling is restricted, the engine is automatically stopped in response to a predetermined vehicle stopping condition. Thereafter, when a predetermined vehicle starting condition is established, i.e., a throttle grip is operated for opening in this embodiment, the engine is automatically restarted, resulting in that the vehicle can be started.

Figure 3:
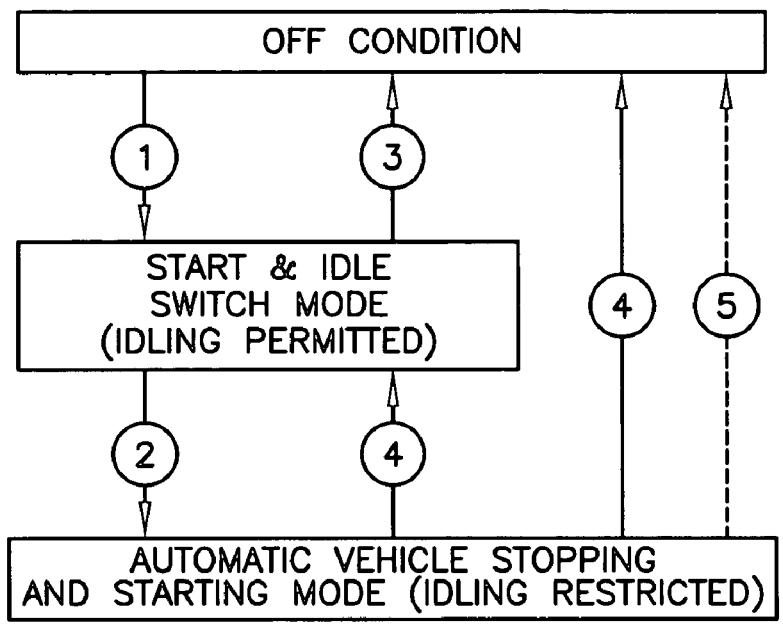
FIG. 3 is a diagram schematically showing operation mode changeover conditions in the automatic engine starting and stopping system.

FIG. 3 is a diagram schematically showing operation mode changeover conditions. When the main switch 34 is closed (condition 1 is established), the "start & idle SW mode" is started. Further, in this "start & idle SW mode", when a vehicle speed not less than a scheduled speed (for example, 10 km/hr) is detected and the water temperature is not less than a predetermined temperature (for example, a temperature from which it is estimated that a warm-up operation has been completed) and the idle switch 42 is OFF (condition 2 is established), the "automatic vehicle stopping and starting mode" is started.

In addition, when the idle switch 42 is changed over from "OFF" to "ON" (condition 3 is established) in the "automatic vehicle stopping and starting mode", the operation mode is returned from the "automatic vehicle stopping and starting mode" to the "start & idle SW mode". Incidentally, in either of the "automatic vehicle stopping and starting mode" and the "start & idle SW mode", breaking the main switch (condition 4 is established) leads to an OFF condition.

Figure 4:
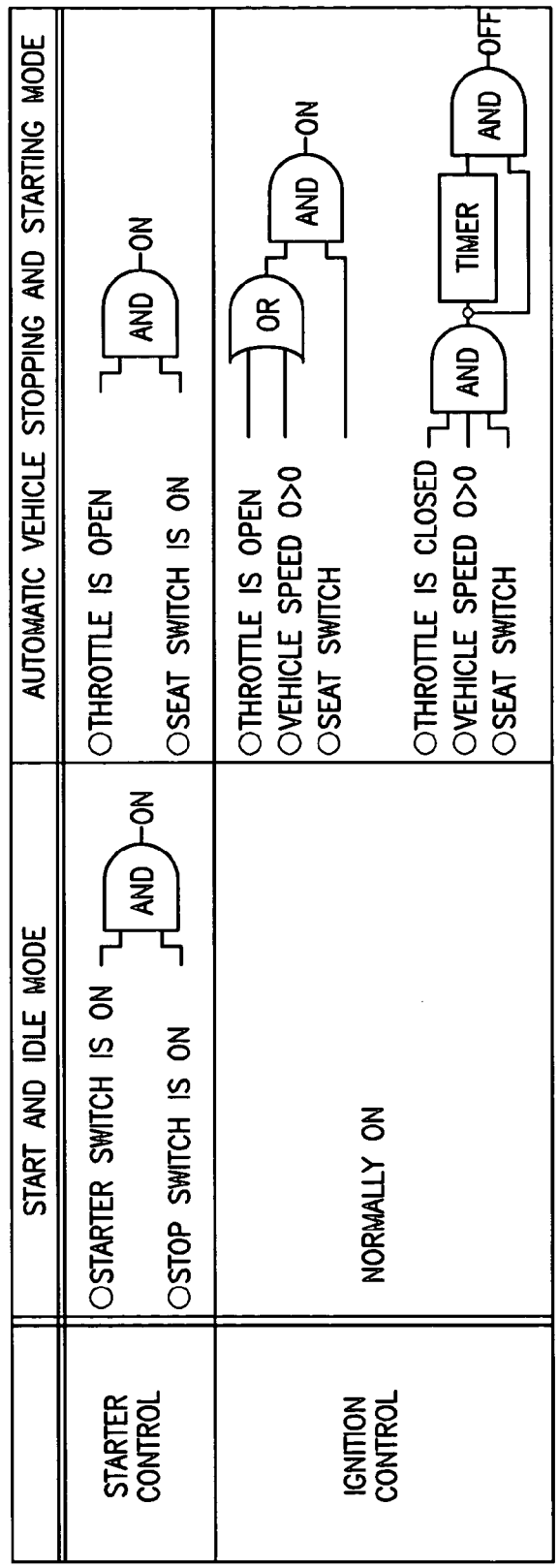
FIG. 4 is a diagram showing typical contents of control in the automatic engine starting and stopping system on the basis of operation mode.

FIG. 4 shows typical contents of control in the automatic engine starting and stopping system on the basis of operation mode. In a starter control for starting the engine by energizing the ACG 38, in the case where the operation mode is the "start & idle SW mode", when the starter switch 41 is turned ON and the brake is operated (the stop switch 51 is turned ON), the ACG 38 is driven with the result that the engine is put into cranking. In the case where the operation mode is the "automatic vehicle stopping and starting mode", when the throttle grip is operated for opening (the throttle switch 46 is turned ON) and the driver is being seated (the seat switch 43 is ON), the ACG 38 is driven with the result that the engine is put into cranking.

In an ignition control for controlling ignition, ignition is normally permitted when the operation mode is the "start & idle SW mode". When the operation mode is the "automatic vehicle stopping and starting mode", ignition is permitted if the driver is being seated and if the throttle is operated to open or the vehicle speed is not 0 (zero). On the other hand, if the driver is being seated and the throttle is closed and the state of zero vehicle speed continues for a predetermined period of time, ignition is prohibited.

Figure 5:
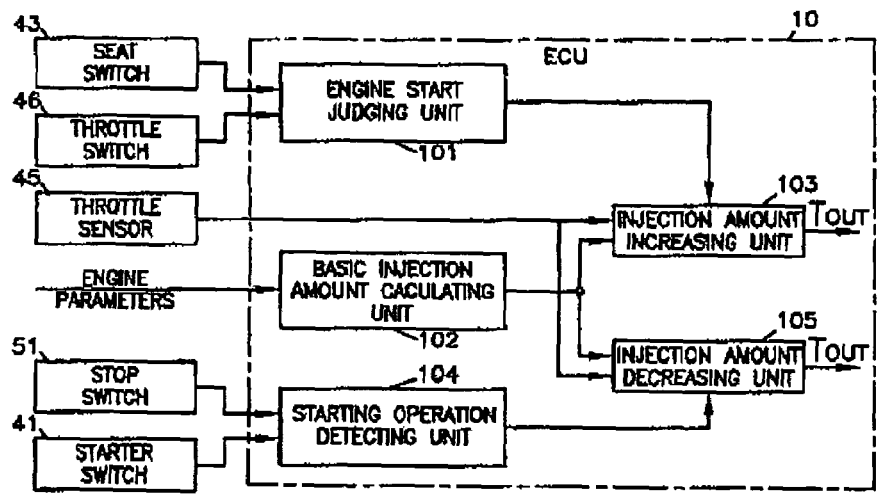
FIG. 5 is a functional block diagram of a first embodiment of the fuel injection control system according to the present invention.

FIG. 5 is a functional block diagram of the fuel injection control system according to the present invention, in which the same symbols as above denote components which are the same as or equivalent to the above-mentioned.

An engine start judging unit 101 detects the presence or absence of a vehicle starting operation on the basis of the state of the throttle switch 46 during automatic stoppage of the engine in the "automatic vehicle stopping and starting mode". In this case, when the seating of the driver is confirmed based on the state of the seat switch 43, the engine is started. A basic injection amount calculating unit 102 calculates a basic fuel injection amount $T_i$, based on engine parameters such as the engine cooling water temperature $T_W$ and the engine speed $N_e$. An injection amount increasing unit 103 performs a control to increase the fuel injection amount at the time of starting the engine from an automatic stoppage state of the engine, based on the throttle opening detected by the throttle sensor 45.

A starting operation detecting unit 104 starts the engine when the states of the stop switch 51 and the starter switch 41 satisfy predetermined conditions in other state than the automatic stoppage state of the engine. An injection amount decreasing unit 105 performs a control to decrease the fuel injection amount, based on the throttle opening detected by the throttle sensor 45.

Figure 6:
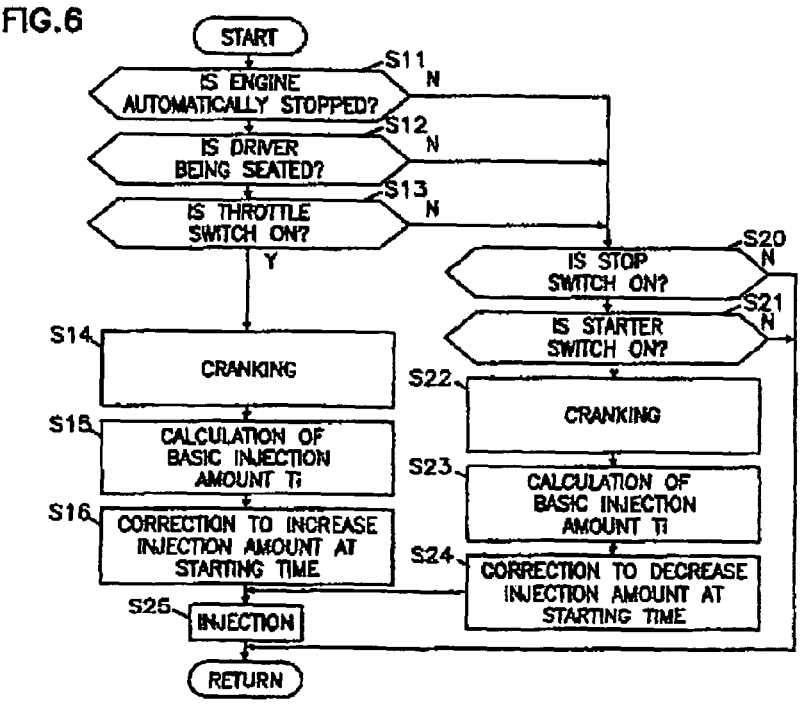
FIG. 6 is a flow chart showing the procedure of fuel injection control.

FIG. 6 is a flow chart showing the procedure of fuel injection control in the present invention. In step S11, it is judged whether or not the engine is in the automatic stoppage state, and, if the engine is in the automatic stoppage state, step S12 is entered. If the engine is in an engine stop state other than the automatic stoppage state or in a state before starting, step S20 is entered. In step S20, it is judged whether or not a braking operation is being performed, based on the contact status of the stop switch 51. If the braking operation is being performed, step S21 is entered, in which it is judged whether or not the starter switch 41 is ON. If the starter switch 41 is also ON, step S22 is entered, in which the ACG 38 is energized by the starting operation detecting unit 104 with the result that the engine is put into cranking.

Figure 7:
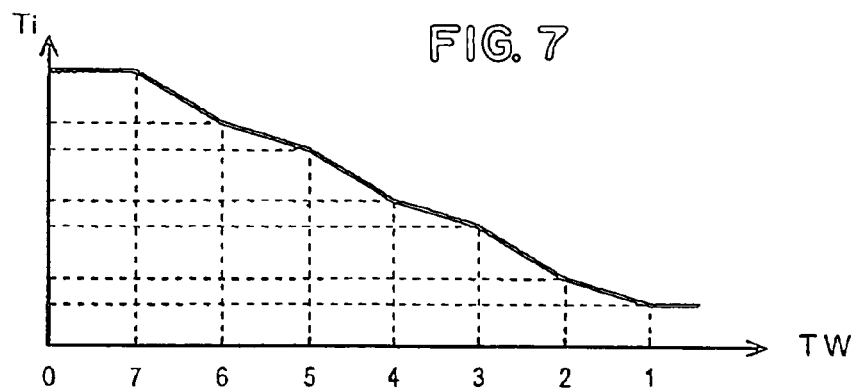
FIG. 7 is a diagram showing one example of a basic injection amount table at the time of starting the engine.

In step S23, in the basic injection amount calculating unit 102, the basic injection amount table is referred to on the basis of the cooling water temperature $T_W$ detected by the water temperature sensor, to search a basic injection amount $T_i$ at the starting time according to the cooling water temperature $T_W$. FIG. 7 shows one example of the basic injection amount table at the starting time. In this embodiment, the basic injection amount $T_i$ is set to decrease as the cooling water temperature $T_W$ increases.

In step S24, in the injection amount decreasing unit 105, an injection amount decrease table is referred to based on the throttle opening $\theta_{th}$, to search an injection amount decrease coefficient $K_{thcr1}$ according to the throttle opening $\theta_{th}$. Then, the basic injection amount $T_i$ is multiplied by the injection amount decrease coefficient $K_{thcr1}$ to obtain a starting time injection amount $T_{out}$ (=$K_{thcr1} \times T_i$).

Figure 8:
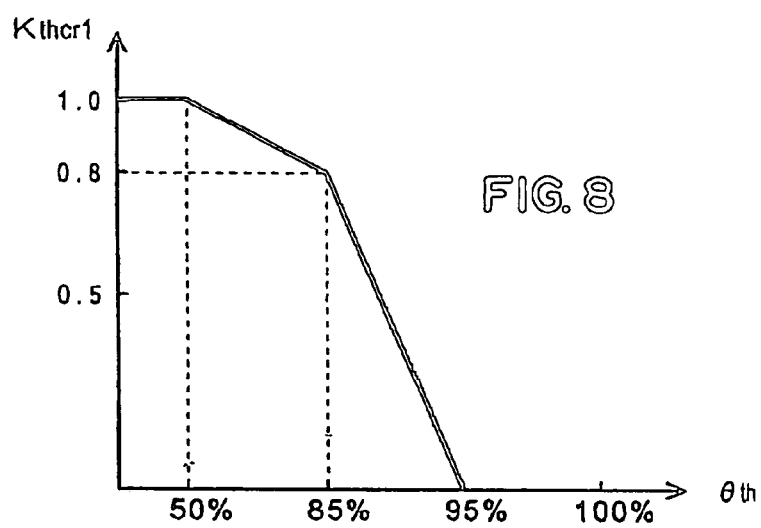
FIG. 8 is a diagram showing one example of an injection amount decrease table.

FIG. 8 is a diagram showing one example of the injection amount decrease table, in which the injection amount decrease coefficient $K_{thcr1}$ is set to decrease as the throttle opening $\theta_{th}$ increases so that the injection amount is gradually decreased as the throttle opening $\theta_{th}$ increases. In this embodiment, the control to decrease the injection amount is started at the time when the throttle opening $\theta_{th}$ has exceeded about 50%. In step S25, a fuel in an amount according to the starting time injection amount $T_{out}$ is injected from an injector 35.

On the other hand, when it is judged in step S11 that the engine is in the automatic stoppage state, step S12 is entered, in which it is judged by the engine start judging unit 101 whether or not the driver is being seated, based on the contact status of the seat switch 43. If the driver is being seated, step S13 is entered, whereas if the driver is not being seated, step S20 is entered. In step S13, it is judged whether or not the throttle grip has been operated for opening, i.e., whether or not a vehicle starting operation has been conducted, based on the contact status of the throttle switch 46. If the throttle grip has been operated for opening, step S14 is entered, whereas if the throttle grip has not been operated for opening, step S20 is entered.

In step S14, the ACG 38 is energized by the engine start judging unit 101, with the result that the engine is put into cranking. In step S15, the basic injection amount table (FIG. 7) is referred to based on the cooling water temperature $T_W$, in the same manner as above, to search a basic injection amount $T_i$ according to the cooling water temperature $T_W$. In step S16, in the injection amount increasing unit 103, the injection amount increase table is referred to based on the throttle opening $\theta_{th}$, to search an injection amount increase coefficient $K_{thcr2}$ according to the throttle opening $\theta_{th}$. Then, the basic injection amount $T_i$ is multiplied by the injection amount increase coefficient $K_{thcr2}$ to obtain a starting time injection amount $T_{out}$ $(=K_{thcr2} \times T_i)$.

Figure 9:
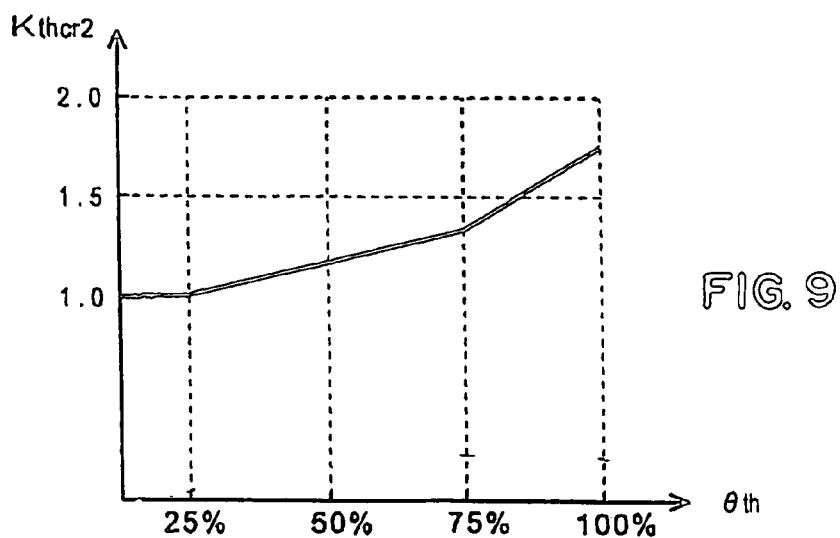
FIG. 9 is a diagram showing one example of an injection amount increase table.

FIG. 9 is a diagram showing one example of the injection amount increase table, in which the injection amount increase coefficient $K_{thcr2}$ is set to increase as the throttle opening $\theta_{th}$ increases so that the injection amount is gradually increased as the throttle opening $\theta_{th}$ increases, on the contrary to the above-mentioned injection amount decrease table (FIG. 8).

In this embodiment, the control to increase the injection amount is started at the time when the throttle opening $\theta_{th}$ has exceeded about 25% which is smaller than about 50% for starting the control to decrease the injection amount. When the throttle opening (about 25%) at which the control to increase the injection amount is thus set to be smaller than the throttle opening (about 50%) at which the control to decrease the injection amount is started, the timing of starting the injection amount increasing/decreasing control can be set appropriately both at the time of starting the engine from other state than the automatic stoppage state when the control to decrease the injection amount is required only in the case where the throttle opening is comparatively large because the engine temperature is low and at the time of starting the engine from the automatic stoppage state when the control to increase the injection amount is required from a comparatively small throttle opening because the engine temperature is high. In step S25, the fuel in an amount according to the starting time injection amount $T_{out}$ is injected from the injector 35.

Thus, according to this embodiment, at the time of starting the engine after automatic stoppage of the engine when the throttle is opened widely, the fuel injection amount is corrected to increase, whereby the fuel is supplied in a sufficient amount according to the throttle opening $\theta_{th}$, so that the air-fuel ratio is controlled to an appropriate value and the starting performance of the engine is enhanced.

Figure 10:
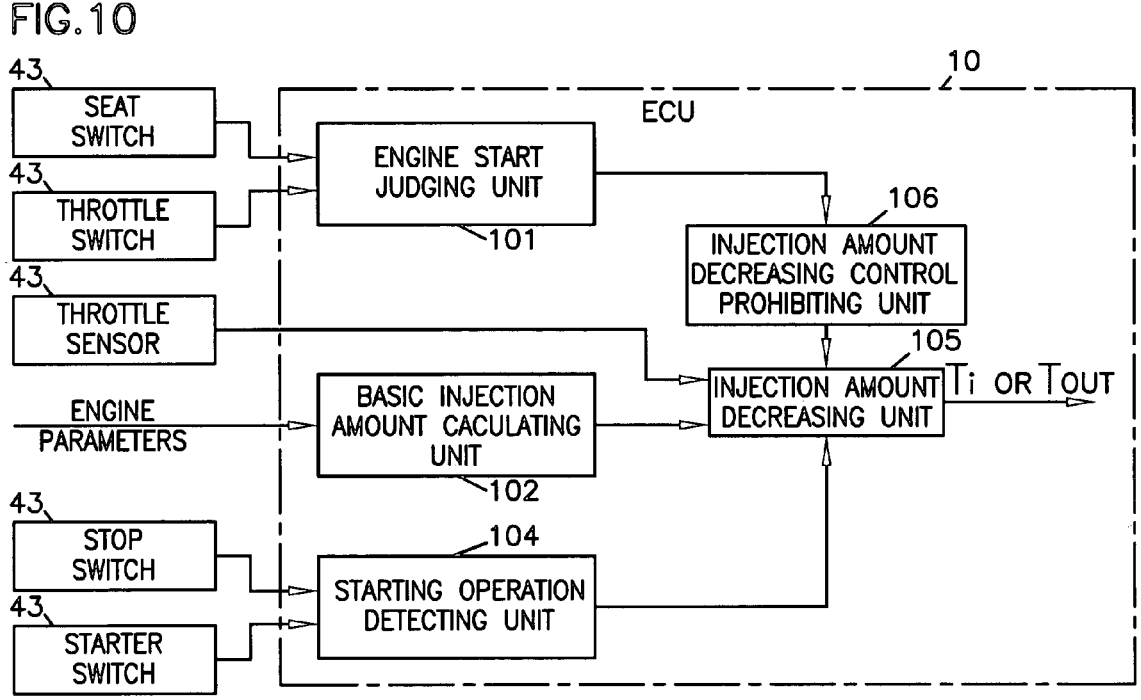
FIG. 10 is a functional block diagram of a second embodiment of the fuel injection control system according to the present invention.

FIG. 10 is a functional block diagram of a second embodiment of the fuel injection control system according to the present invention, in which the same symbols as used above denote components which are the same as or equivalent to the above-mentioned.

In the first embodiment described above, it has been described that a correction to decrease the fuel injection amount is performed at the time of starting the engine from other state than the automatic stoppage state of the engine, whereas a correction to increase the fuel injection amount is performed at the time of starting the engine from the automatic stoppage state. On the other hand, in this embodiment, the correction to decrease the fuel injection amount is prohibited at the time of starting the engine from the automatic stoppage state of the engine, whereby the fuel injection amount at an engine starting time is relatively increased at the time of starting the engine from the automatic stoppage state as compared with the time of starting the engine from other state than the automatic stoppage state.

In FIG. 10, an injection amount decreasing control prohibiting unit 106 prohibits the operation of an injection amount decreasing unit 105 when it is judged by the engine start judging unit 101 that the starting operation is starting the engine from the automatic stoppage state of the engine. As a result, the basic injection amount $T_i$ is outputted as it is from the injection amount decreasing unit 105.

According to this embodiment, the fuel injection amount at the engine starting time is relatively increased at the time of starting the engine from the automatic stoppage state as compared with the time of starting the engine from other state than the automatic stoppage state, so that an appropriate air-fuel ratio can be obtained, and the starting performance of the engine is enhanced.

We claim:

1. A fuel injection control system for a vehicle having a throttle and an automatic engine stopping and starting system comprising:
    a throttle sensor for detecting throttle opening,
    engine start judging means, for starting the engine in response to throttle opening after automatic stoppage of the engine,
    basic injection amount calculating means, for calculating a basic fuel injection amount on the basis of predetermined engine parameters, and
    injection amount increasing means for increasing the fuel injection amount at the time of starting the engine from the automatic stoppage state of the engine, based on throttle opening.

2. The fuel injection control system of claim 1, further comprising:
    injection amount decreasing means for decreasing the fuel injection amount on the basis of the throttle opening at the time of starting the engine from a state other than from the automatic stoppage state of the engine.

3. The fuel injection control system of claim 2, wherein the injection amount increasing means comprises:
    an injection amount increase table comprising the relationship between the throttle opening at the engine starting time and an injection amount increase coefficient,
    means for obtaining an injection amount increase coefficient on the basis of the throttle opening and the injection amount increase table, and
    calculating means for setting a new basic injection amount as the result of multiplying the basic injection amount by the injection amount increase coefficient.

4. The fuel injection control system of claim 2, wherein the throttle opening at which the increase of the injection amount is started is smaller than the throttle opening at which the decrease of the injection amount is started.

5. The fuel injection control system of claim 4, wherein the throttle opening at which the increase of the injection amount is started is about 25% open and the throttle opening at which the decrease of the injection amount is started is about 50% open.

6. The fuel injection control system of claim 1, wherein the vehicle is a two-wheeled, single-cylinder vehicle.

7. The fuel injection control system of claim 1, further comprising a seat switch, wherein the seat switch has a loaded position and an unloaded position, wherein the engine start judging means only starts the engine in response to throttle opening when the seat switch is in the loaded position.

8. A fuel injection control system for a vehicle with an automatic engine stopping and starting system mounted thereon for automatically stopping an engine in response to a predetermined vehicle stopping condition and thereafter restarting the engine in response to a predetermined vehicle starting operation, the fuel injection control system comprising:
 a throttle sensor for detecting the throttle opening,
 engine start judging means for starting the engine in response to a throttle opening operation during automatic stoppage of the engine,
 basic injection amount calculating means for calculating a basic fuel injection amount on the basis of predetermined engine parameters,
 injection amount decreasing means for decreasing the fuel injection amount at the time of starting the engine, and
 injection amount decrease prohibition means for prohibiting decrease of the fuel injection amount at the time of starting the engine from an automatic stoppage state of the engine.

9. The fuel injection control system of claim 8, the predetermined engine parameters comprising engine cooling water temperature and engine speed.

10. The fuel injection control system of claim 8, wherein the vehicle is a two-wheeled, single-cylinder vehicle.

11. The fuel injection control system of claim 8, further comprising a seat switch, wherein the seat switch has a loaded position and an unloaded position, wherein the engine start judging means only starts the engine in response to throttle opening when the seat switch is in the loaded position.

12. A method for controlling the injection amount of a fuel supplied to an engine attached to a vehicle having an automatic engine stopping and starting system, comprising:
 sensing throttle opening;
 sensing pre-determined conditions;
 calculating a basic fuel injection amount;
 determining the stoppage state of the engine; and
 adjusting the basic fuel injection amount at the time of starting the engine from the automatic stoppage state of the engine, based on throttle opening.

13. The method of claim 12, wherein the predetermined conditions comprise engine cooling water temperature and engine speed.

14. The method of claim 12, wherein adjusting the basic fuel injection amount in response to the stoppage state of the engine, comprises increasing the fuel injection amount when an automatic stoppage state is detected.

15. The method of claim 12, wherein adjusting the basic fuel injection amount in response to the stoppage state of the engine, comprises decreasing the fuel injection amount when a non-automatic stoppage state is detected.

16. The method of claim 12, further comprising the step of cranking the engine.

17. The method of claim 16, the vehicle comprising a seat switch having a loaded position and an unloaded position, wherein the step of cranking the engine is only performed when the seat switch is in the loaded position.

18. The method of claim 12, wherein the vehicle is a two-wheeled, single-cylinder vehicle.

* * * * *